United States Patent [19]
Finkel

[11] 3,746,042
[45] July 17, 1973

[54] MULTI-BLADE DAMPER

[75] Inventor: Nathan B. Finkel, Lynbrook, N.Y.

[73] Assignee: Swift Sheetmetal Corporation, Glendale, N.Y.

[22] Filed: Nov. 22, 1971

[21] Appl. No.: 201,039

[52] U.S. Cl. .................. 137/601, 49/78, 49/84, 98/40 V
[51] Int. Cl. .............................. F24f 7/00
[58] Field of Search .................. 137/601, 637; 251/212; 74/DIG. 10; 98/40 V, 121 A; 49/77, 78, 84

[56] References Cited
UNITED STATES PATENTS

| 1,504,507 | 8/1924 | Richardson | 251/212 |
| 2,839,943 | 6/1958 | Caldwell et al. | 74/DIG. 10 |
| 2,723,705 | 11/1955 | Collins | 74/DIG. 10 |

Primary Examiner—Robert G. Nilson
Assistant Examiner—Edward Look
Attorney—Alex Friedman, James K. Silberman et al.

[57] ABSTRACT

A multi-blade damper is moved between open and closed positions by pinion gears and racks joined together for conjoint motion. The racks lie on opposite sides of adjacent pinion gears so that movement of the racks causes adjacent blades to rotate in opposite senses.

4 Claims, 6 Drawing Figures

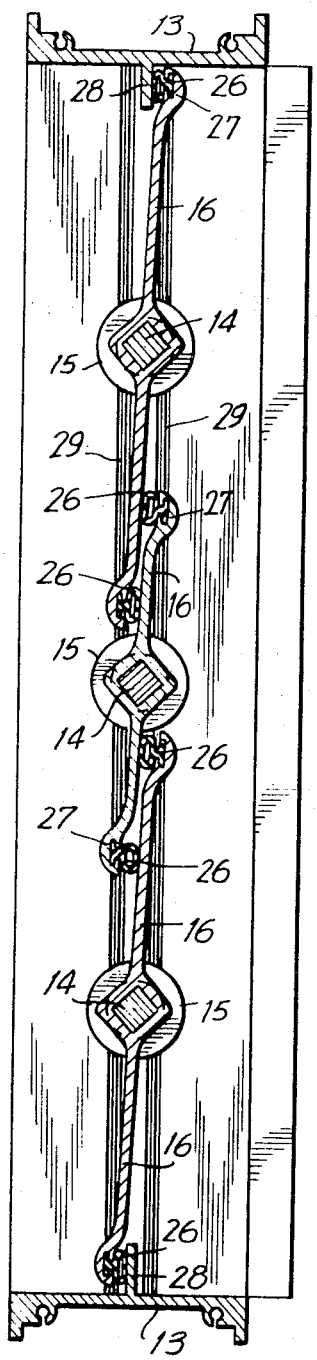
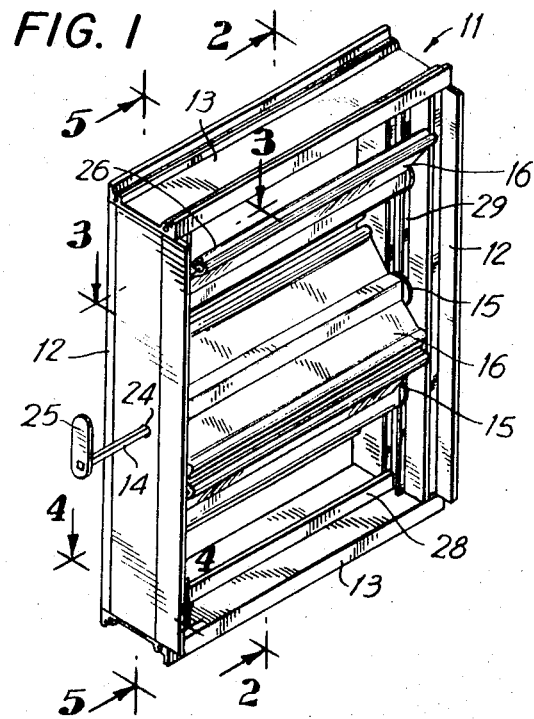
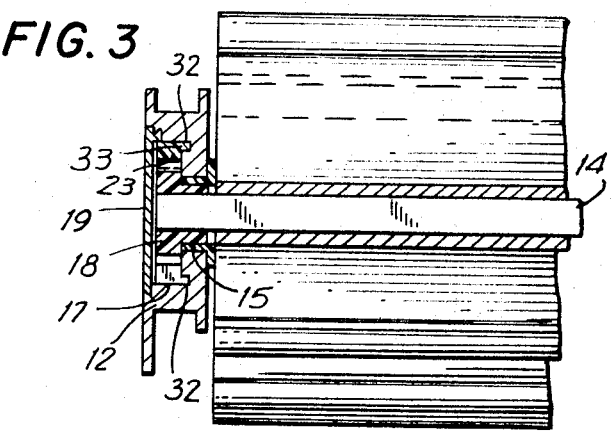
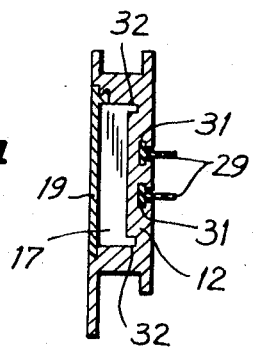

FIG. 5
FIG. 6
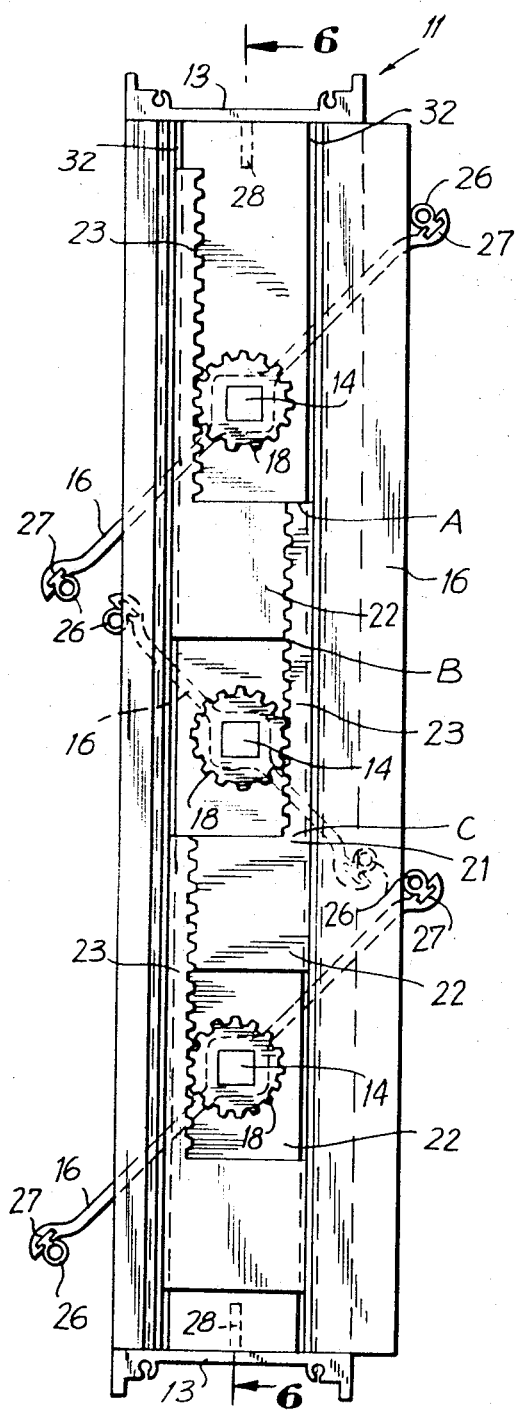
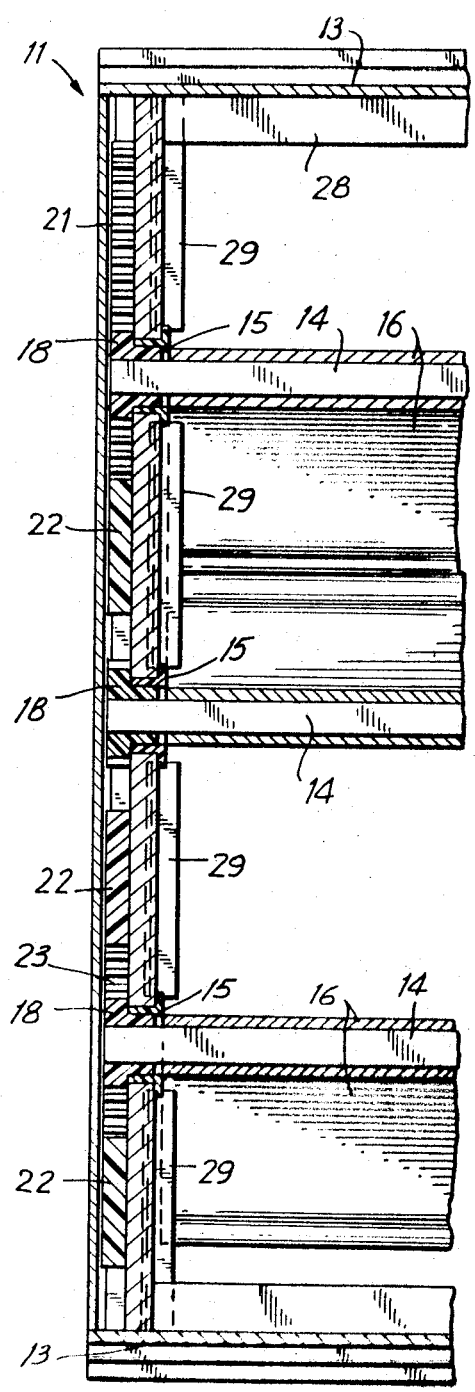

3,746,042

MULTI-BLADE DAMPER

BACKGROUND OF THE INVENTION

In the field of air flow control, it is well known to use dampers incorporating a plurality of blades or slats rotatable between an open position and a closed position. Moreover, it is well known to construct the damper so that adjacent blades rotate in opposite directions, in order to avoid the turning effect which results when all the blades rotate in the same direction for better volume control. A variety of mechanisms have been disclosed for providing for such counter-rotation. However, these have, in general, required a large number of individual moving parts involving a multiplicity of levers and links of different types resulting in high fabrication costs. Also, the necessity of providing for systems of a variety of sizes increased the number of different types of operating mechanisms for which corresponding parts had to be manufactured and stocked.

SUMMARY OF THE INVENTION

Counter-rotation of blades in an improved multi-plate damper is provided by pinion gears proximate one end of each blade shaft and a rack assembly formed of individual racks placed at opposite sides of adjacent gears. The racks are preferably joined together into an assembly by means of gear teeth. A rack assembly for dampers with any number of blades can be fabricated by the use of a plurality of individual racks since any number of racks can be joined together to form a rack assembly. Racks and pinions may be formed of polymers having high tensile strength. The polymers may be glass-fiber filled.

Accordingly, an object of the present invention is to provide an improved control mechanism for a multi-blade damper with counter-rotating blades requiring a minimum number of different types of elements.

Another object of the present invention is to provide an improved multi-blade damper with counter-rotating blades wherein the control elements are simple to manufacture and occupy a minimum of space.

A further object of the invention is to provide an improved control system for a multi-blade damper with counter-rotating blades where standarized components may be used regardless of the number of damper blades.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a multi-blade damper in accordance with the present invention;

FIG. 2 is a sectional view, at an enlarged scale, taken along line 2—2 of FIG. 1;

FIG. 3 is a partial sectional view, at an enlarged scale, taken along line 3—3 of FIG. 1;

FIG. 4 is a sectional view, at an enlarged scale, taken along line 4—4 of FIG. 1;

FIG. 5 is a sectional view, at an enlarged scale, taken along line 5—5 of FIG. 1; and FIG. 6 is a partial sectional view, taken along line 6—6 of FIG. 5.

DESCRIPTION OF THE PREFERRED EMBODIMENTS

The damper of the present invention has a frame generally indicated by the reference numeral 11 which is rectangular, the frame consisting of a first pair of sides 12 and a second pair of sides 13. A plurality of axles are mounted in bushings 15 which, in turn, are rotatably mounted in sides 12.

To each axle 14 is rigidly attached a blade 16. Axle 14 is preferably square in order to hold blade 16 without slippage.

At least one side 12, as shown in FIG. 3, has a channel 17 therein. Pinion gears 18 are located within channel 17 and are held therein by a cover 19 adapted to be fixed to side 12 over channel 17. Pinion gears 18 are shaped to receive square axle 14, and are fixedly mounted thereon in any suitable manner.

A plurality of racks 21 are slidably mounted in channel 17 and pinion gears 18 mesh with racks 21. Each rack 21 consists of a flag portion 22 and a staff portion 23. Staff portion 23 has two operative portions indicated on FIG. 5 as A–B and B–C. The rack teeth of portion B-C function in the rotation of pinion gears 18 as blades 16 are positioned between fully opened and fully closed. The rack teeth of portion A-B are in excess of the teeth needed for rotation of pinion gears 18 and function to join each rack to an adjoining rack by means of corresponding teeth in the flag of the adjoining rack. In this way, any number of racks can be joined for conjoint motion so that externally-caused movement of one rack causes movement of all racks in the same direction. As is evident from FIG. 5, adjacent racks have staffs on alternate sides of adjacent pinion gears. As a result, movement of the rack assembly causes adjacent blades to rotate in opposite senses.

To provide for rotation of the blades, one of said axles 14 may extend through an opening 24 in a first side 12. (FIG. 1) To the extended axle 14 may be joined a lever 25. Rotation of axle 14 by means of lever 25 causes rotation of pinion gear 18 which moves the corresponding rack 21 and causes simultaneous motion of all racks in the same direction. The positioning of the racks 21 on opposite sides of alternate pinion gears 18 then result in counter-rotation of adjacent pinion gears 18 and counter-rotation of adjacent blades 16.

To seal the damper against air flow when the blades 16 are in closed position, soft gaskets 26 are held in grooves 27 at each of the long edges of each blade. The gaskets 26 seat either against blades 16 or against stops 28. Such stops 28 may be integral with second sides 13. The sides of blades 16, when the blades are in closed position, seat against soft rubber gaskets 29 (FIG. 4) held in under-cut grooves 31.

To ensure that the racks 21 slide properly in channel 17, channel 17 may be provided with guide grooves 32 into which lips 33 on racks 21 fit. It should be noted that where such guide lips and grooves are used, racks may be provided in left-hand and right-hand versions which are mirror images of each other.

Where high resistance to turning of the blades is expected, as when the blades are unusually large or the rate of air flow is great, then both of the first sides may have channels therein and pinions and racks may be placed in both channels.

A preferred material for the racks and pinion gears is a polyacetal sold under the name of Delrin by E. I. DuPont of Wilmington, Detroit. Other suitable materials are acrylonitrile-butadiene-styrene known by the abbreviation ABS, polyamides, polyesters, epoxies and polycarbonates. These materials may be strengthened by inclusion of glass-fiber.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A multi-blade damper wherein adjacent blades rotate in opposite senses, comprising an open rectangular frame having a first pair of parallel edges and a second pair of parallel edges, a plurality of axles mounted rotatably in said first pair of parallel edges, said axles being essentially parallel to each other and to said second pair of parallel edges, a plurality of damper blades each mounted rigidly to an axle and each being of such dimensions that said damper blades in a first position block the opening in said frame essentially completely against air flow and in a second position present maximum opening for air flow, said blades being positionable at any intermediate position between said first and said second position, pinion gears equal in number to said axles each being rigidly attached to one of said axles and all lying proximate one of said first pair of parallel edges, first racks equal in number to said pinion gears slidable along said one edge and meshing operatively with said pinion gears, and means joining said first racks for conjoint movement, said first racks being at alternate sides of said pinion gears so that externally caused movement of said first racks in one direction causes adjacent pinion gears to rotate in opposite senses, each of said racks having a toothed flag portion and a toothed staff portion, a portion of the teeth on each staff portion being so disposed along said one edge as to be meshable with a pinion gear, and a further portion of the teeth on each staff portion being meshable with the teeth on the flag portion of an adjacent rack, thereby serving to join adjacent racks for conjoint motion.

2. A multi-blade damper as defined in claim 1, wherein said one edge has a channel formed therein, said channel having grooves proximate opposite internal faces of said channel, and each rack has a lip adapted for sliding within one of said grooves, alternate racks are in right and left hand forms which are mirror images of each other, thereby providing for smooth sliding and accurate transverse positioning of said racks in said channel.

3. A multi-blade damper as defined in claim 1, wherein said racks and pinion gears are of a material selected from the group consisting of polyacetals, ABS, polyamides, polyesters, epoxies and polycarbonates.

4. A multi-blade damper as defined in claim 3, wherein said material includes glass-fiber to strengthen said racks and pinion gears fabricated therefrom.

* * * * *